(12) United States Patent
Sudoh

(10) Patent No.: US 8,284,501 B2
(45) Date of Patent: Oct. 9, 2012

(54) OPTICAL IMAGING SYSTEM, CAMERA DEVICE, AND HAND-HELD DATA TERMINAL DEVICE

(75) Inventor: Yoshifumi Sudoh, Machida (JP)

(73) Assignee: Ricoh Company, Ltd., Tokyo (JP)

( * ) Notice: Subject to any disclaimer, the term of this patent is extended or adjusted under 35 U.S.C. 154(b) by 114 days.

(21) Appl. No.: 12/858,028

(22) Filed: Aug. 17, 2010

(65) Prior Publication Data

US 2011/0043927 A1 Feb. 24, 2011

(30) Foreign Application Priority Data

Aug. 21, 2009 (JP) ................................. 2009-191625

(51) Int. Cl.
G02B 9/00 (2006.01)

(52) U.S. Cl. .......................... 359/754; 359/749; 359/793

(58) Field of Classification Search .......... 359/749–757, 359/759–761, 763, 764, 767–772, 779–784, 359/791–794

See application file for complete search history.

(56) References Cited

U.S. PATENT DOCUMENTS

| | | | |
|---|---|---|---|
| 4,776,680 A | 10/1988 | Tanaka | |
| 4,896,950 A | 1/1990 | Endo et al. | |
| 5,032,013 A | 7/1991 | Shibayama | |
| 5,329,401 A | 7/1994 | Sato | |
| 6,538,825 B1 | 3/2003 | Sun | |
| 6,560,042 B2 | 5/2003 | Murata et al. | |
| 6,891,684 B2 | 5/2005 | Taki | |
| 7,167,318 B2 | 1/2007 | Tomioka | |
| 7,372,636 B2 | 5/2008 | Sudoh | |
| 7,535,653 B2 | 5/2009 | Sudoh | |
| 7,623,298 B2 | 11/2009 | Sudoh | |
| 7,636,201 B2 | 12/2009 | Sudoh et al. | |
| 7,719,773 B2 | 5/2010 | Atsuumi et al. | |
| 2008/0278779 A1 | 11/2008 | Nishina et al. | |
| 2009/0147375 A1 | 6/2009 | Sudoh et al. | |
| 2009/0244724 A1* | 10/2009 | Shibata | 359/792 |

(Continued)

FOREIGN PATENT DOCUMENTS

EP 0 405 532 A2 1/1991

(Continued)

OTHER PUBLICATIONS

Extended European Search Report issued Jan. 12, 2011, in Application No. /Patent No. 10251474.2-1524.

(Continued)

*Primary Examiner* — Darryl J Collins
(74) *Attorney, Agent, or Firm* — Oblon, Spivak, McClelland, Maier & Neustadt, L.L.P.

(57) ABSTRACT

An optical imaging system includes a first lens group having a positive or negative optical power, an aperture diaphragm, and a second lens group having a positive optical power arranged in order from an object side. The first lens group includes a first front lens group having at least two negative lenses and a first rear lens group having at least one positive lens with an airspace in-between the first front and rear lens groups. The second lens group includes a second front lens group having first positive and negative lenses, second negative and positive lenses arranged in order from the object side, and a second rear lens group including at least one aspherical lens. When focusing on an object in a close range from infinity, the second lens group moves to the object side while an interval between the second front and rear lens groups are shortened.

18 Claims, 14 Drawing Sheets

U.S. PATENT DOCUMENTS

2009/0323200 A1 12/2009 Sudoh
2010/0027136 A1* 2/2010 Ohashi et al. ............. 359/753

FOREIGN PATENT DOCUMENTS

| | | |
|---|---|---|
| EP | 0 405 532 A3 | 1/1991 |
| EP | 1 734 393 A1 | 12/2006 |
| JP | 6-308385 | 11/1994 |
| JP | 6-324264 | 11/1994 |
| JP | 2004-61680 | 2/2004 |
| JP | 3629191 | 12/2004 |
| JP | 2005-62771 | 3/2005 |
| JP | 2006-251437 | 9/2006 |
| JP | 2006-349920 | 12/2006 |
| JP | 2010-8577 | 1/2010 |

OTHER PUBLICATIONS

U.S. Appl. No. 12/786,913, filed May 25, 2010, Sudoh, et al.
U.S. Appl. No. 12/861,343, filed Aug. 23, 2010, Nakayama, et al.

* cited by examiner

OPTICAL IMAGING SYSTEM, CAMERA DEVICE, AND HAND-HELD DATA TERMINAL DEVICE

CROSS REFERENCE TO RELATED APPLICATION

The present application is based on and claims priority from Japanese Patent Application No. 2009-191625, filed on Aug. 21, 2009, the disclosure of which is hereby incorporated by reference in its entirety.

BACKGROUND OF THE INVENTION

1. Field of the Invention

The present invention relates to an optical imaging system, a camera device, and a hand-held data terminal device including the optical imaging system. The optical imaging system is applicable to a silver film camera, a digital camera, and a video camera. It is also applicable to a hand-held data terminal device.

2. Description of the Related Art

Along with widespread of a digital camera, users have come to have diverse demands for the digital camera. Particularly, users have desired development of a high image quality, compact-size camera incorporating a high-performance, large-aperture (small f-number) single focus lens.

Such a compact-type, single focus lens camera is required to exert a high optical performance with a resolution equivalent to an image sensor with at least 10 to 20 million pixels. Furthermore, it is required to reduce coma flares with an aperture fully opened, prevent blurs in point images in the periphery of angle of view at a high contrast, prevent unwanted colors in an image portion with a large difference in brightness with less chromatic aberration, and generate images with less distortion.

In terms of the large aperture, in order to distinguish such a single focus lens camera from a general compact-size camera incorporating a zoom lens, it is required to have an f-number of at least 2.4 or less, or preferably 2.0 or less. Most users prefer a photographic lens of a wide angle of view so that a half angle of view of a focus lens should be preferably 38 degrees or more. The half angle of view of 38 degrees is equivalent to a focal length of 28 mm of a 35 mm silver film camera.

Due to property of an image sensor having a color filter and a micro lens arranged on each pixel, a digital camera is preferably configured that an exit pupil position is distanced away from an image plane to make ambient light incident on an image sensor at a substantially vertical angle. As a typical example of a wide-angle, single focus lens, a so-called retrofocus type lens system is often adopted in such a digital camera. In the retrofocus type, a lens group having a negative refraction and a lens group having a positive refraction are arranged on an object side and on an image side, respectively.

The retrofocus type lens system generally performs rear focusing. However, it has a problem of tilting an image plane when focusing. With a larger aperture, especially, the tilt of an image plane largely affects the quality of images. In view of solving such a problem, a focusing method by moving a plurality of lens groups has been proposed. Japanese Patent No. 3629191 (Reference 1) and Japanese Laid-open Patent Publication No. 6-324264 (Reference 2) disclose an optical imaging system using such a focusing method to achieve a large aperture and a wide angle of view to some extent, for example. The optical imaging system in Reference 1 realizes a half angle of view of 27 degrees and f-number being 2.8 or more but the light amount is relatively small.

The optical imaging system in References 1 and 2 are configured to focus on an object in a close range from infinity by moving lens groups before and after the aperture diaphragm together to an object side so that intervals between the lens groups are reduced. In other words, a front lens group is protruded to the object side at focusing, increasing the total length of the lens system. This leads to preventing downsizing of an imaging device.

SUMMARY OF THE INVENTION

The present invention aims to provide a downsized, wide-angle, large aperture optical imaging system having a half angle of view of 38 degrees or more and f-number being 2.0 or less and exerting a high optical performance in a close range. It also aims to provide a camera device and a hand-held data terminal device incorporating such an optical imaging system.

According to one aspect of the present invention, an optical imaging system comprises a first lens group having a positive or negative optical power, an aperture diaphragm, and a second lens group having a positive optical power arranged in order from an object side, wherein the first lens group is comprised of a first front lens group including at least two negative lenses and a first rear lens group having at least one positive lens with an airspace in-between the first front and rear lens groups, the airspace being largest among airspaces in the first lens group, the second lens group is comprised of a second front lens group including a first positive lens, a first negative lens, a second negative lens, and a second positive lens arranged in order from the object side, and a second rear lens group including at least one aspherical lens, and when focusing on an object in a close range from infinity, the second lens group is configured to move to the object side.

Preferably, when focusing on an object in a close range from infinity, an interval between the second front and rear lens groups are shortened.

Preferably, the first lens group is configured to have such a focal length as to satisfy the following condition:

$$-0.2 < f/f1 < 0.4$$

where f1 is a focal length of the first lens group and f is a focal length of the entire optical imaging system.

Preferably, the first and second lens groups are configured to move in such a manner as to satisfy the following condition when focusing on an object at infinity:

$$0.3 < D\_S2/D\_1S < 2.0$$

where $D\_1S$ is an interval between the first lens group and the aperture diaphragm and $D\_2S$ is an interval between the second lens group II and the aperture diaphragm.

Preferably, the first and second lens groups are configured to move in such a manner as to satisfy the following condition when focusing on an object at infinity:

$$0.5 < D\_12/f < 2.5$$

where $D\_12$ is an interval between the first and second lens groups and f is a focal length of the entire optical imaging system.

Preferably, the second rear lens group is comprised of a single aspherical lens.

Preferably, the aperture diaphragm is configured to be in a fixed position on an optical axis of the optical imaging system when focusing on an object in a close range.

Preferably, the first lens group has a positive optical power.

Preferably, the first lens group has a negative optical power.

According to another aspect of the present invention, a camera device comprises the above optical system.

According to another aspect of the present invention, the hand-held data terminal device comprises the above camera device as a photographic unit.

According to another aspect of the present invention, an optical imaging system comprises a first lens group having a positive or negative optical power, an aperture diaphragm, and a second lens group having a positive optical power arranged in order from an object side, wherein when focusing on an object in a close range from infinity, the first lens group is configured to move to an image side while the second lens group is configured to move to the object side; and the first lens group is configured to have such a focal length as to satisfy the following condition:

$$-0.2 < f/f1 < 0.4$$

where f is a focal length of the first lens group and f1 is a focal length of the entire optical imaging system.

Preferably, the first and second lens groups are configured to move in such a manner as to satisfy the following condition when focusing on an object at infinity:

$$0.3 < D\_S2/D\_1S < 2.0$$

where $D\_1S$ is an interval between the first lens group and the aperture diaphragm and $D\_2S$ is an interval between the second lens group and the aperture diaphragm.

Preferably, the first and second lens groups are configured to move in such a manner as to satisfy the following condition when focusing on an object at infinity:

$$0.5 < D\_12/f < 2.5$$

where $D\_12$ is an interval between the first and second lens groups and f is a focal length of the entire optical imaging system.

Preferably, the first lens group is comprised of a first front lens group including at least two negative lenses and a first rear lens group having at least one positive lens with an airspace in-between the first front and rear lens groups, the airspace being largest among airspaces in the first lens group.

Preferably, the second lens group is comprised of a second front lens group having a positive optical power and a second rear lens group including at least one aspherical lens.

Preferably, the aperture diaphragm is configured to be in a fixed position on an optical axis of the optical imaging system when focusing on an object in a close range.

According to another aspect of the present invention, a camera device comprises the above optical imaging system.

Preferably, a camera device further comprises a function to convert a captured image into digital data.

According to another aspect of the present invention, a hand-held data terminal device comprises the above camera device as a photographic unit.

BRIEF DESCRIPTION OF THE DRAWINGS

Features, embodiments, and advantages of the present invention will become apparent from the following detailed description with reference to the accompanying drawings.

DETAILED DESCRIPTION OF THE PREFERRED EMBODIMENTS

Hereinafter, embodiments of the present invention will be described in detail with reference to the accompanying drawings.

Figure 1:
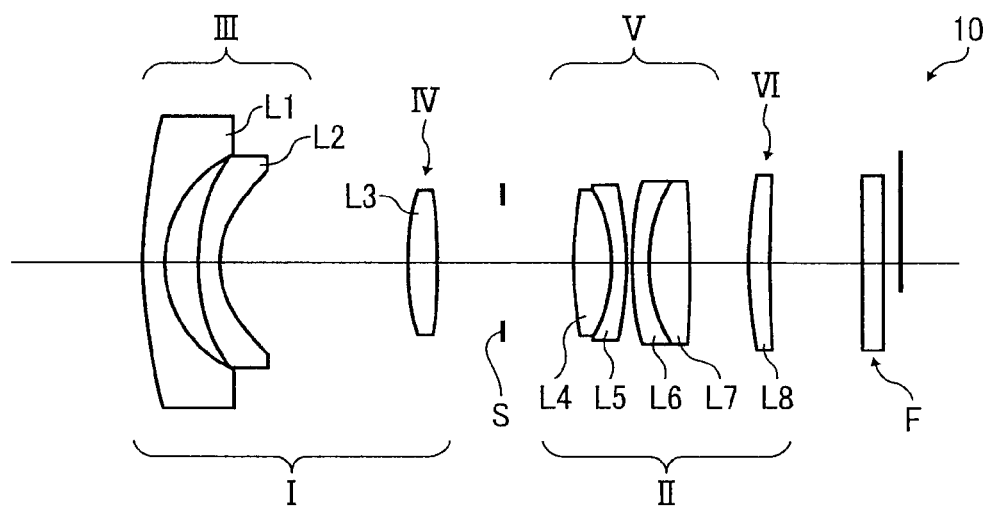
FIG. 1 shows lens arrangement of an optical imaging system according to a first embodiment of the present invention.

FIG. 1 shows an optical imaging system according to later-described first and fifth embodiments. This optical imaging system is comprised of a first lens group I having a positive optical power, an aperture diaphragm S, a second lens group II having a positive optical power, and a filter F arranged in this order from the object side (leftward in the drawing). In the first embodiment, in focusing on an object in a close range from infinity, the first lens group I is moved to an image side (rightward in the drawing) along the optical axis while the second lens group II is moved to the object side along the optical axis. In the fifth embodiment, in focusing on an object in a close range from infinity, only the second lens group II is moved to the object side along the optical axis.

Figure 2:
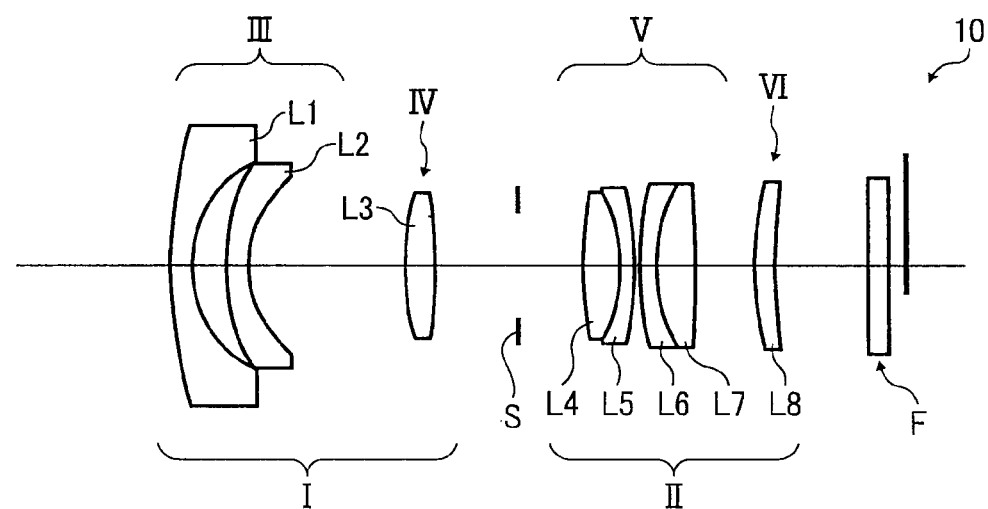
FIG. 2 shows lens arrangement of an optical imaging system according to a second embodiment of the present invention.

FIG. 2 shows the optical imaging system 10 according to a later-described second embodiment. This optical imaging system 10 is comprised of a first lens group I having a positive optical power, an aperture diaphragm S, and a second lens group II having a positive optical power arranged in this order from the object side (left side in the drawing). In the second embodiment, in focusing on an object in a close range from infinity, the first lens group I is moved to an image side along an optical axis while a second lens group II is moved to an object side along the optical axis.

Figure 3:
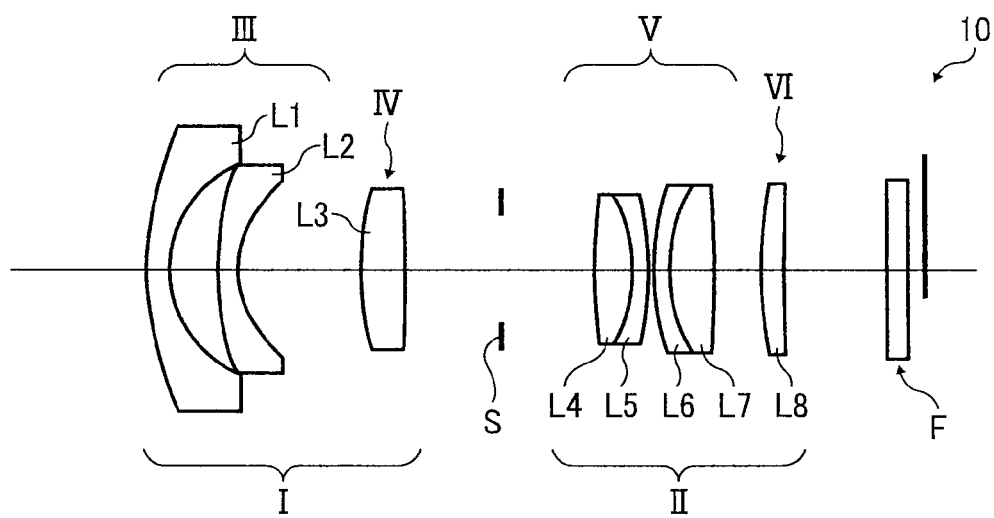
FIG. 3 shows lens arrangement of an optical imaging system according to a third embodiment of the present invention.

FIG. 3 shows the optical imaging system 10 according to a later-described third embodiment. This optical imaging system 10 is comprised of a first lens group I having a negative optical power, an aperture diaphragm S, and a second lens group II having a positive optical power arranged in this order from the object side (left side in the drawing). In the third embodiment, in focusing on an object in a close range from infinity, the first lens group I is moved to an image side along an optical axis while the second lens group II is moved to an object side along the optical axis.

Figure 4:
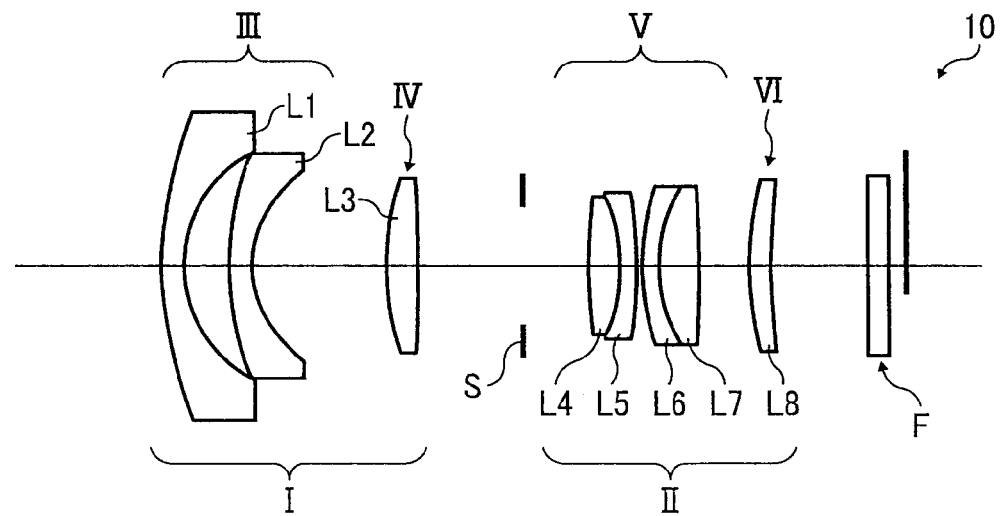
FIG. 4 shows lens arrangement of an optical imaging system according to a fourth embodiment of the present invention.

FIG. 4 shows the optical imaging system 10 according to a later-described fourth embodiment. This optical imaging system 10 is comprised of a first lens group I having a positive optical power, an aperture diaphragm S, and a second lens group II having a positive optical power arranged in this order from the object side (left side in the drawing). In the fourth embodiment, in focusing on an object in a close range from infinity, the first lens group I is moved to an image side along an optical axis while the second lens group II is moved to an object side along the optical axis.

In the above optical imaging system 10 in FIGS. 1 to 4, the first lens group I is comprised of a first front lens group III including at least two negative meniscus lenses L1, L2 on the object side and a first rear lens group IV having at least one positive bi-convex lens L3 on the image side with an airspace in-between the first front and rear lens groups. The airspace is largest among airspaces in the first lens group I. The second lens group II is comprised of a second front lens group V including two pairs of cemented lenses having a positive optical power on the object side and a second rear lens group VI including one aspherical lens (positive meniscus lens) L8 on the image side. The second front lens group V includes a cemented lens of a first positive lens L4 and a first negative lens L5 and a cemented lens of a second negative lens L6 and a second positive lens L7 in this order from the object side.

Note that in the first to fifth embodiments the position of the aperture diaphragm S is unchanged in the optical axis direction when focusing on an object in a close range.

In the first, second, fourth, and fifth embodiments, the first lens group I has a positive optical power while in the third embodiment it has a negative optical power.

In FIG. 1 to FIG. 4 the filter F is a transparent parallel plate such as a cover glass or a color filter for a light receiving element.

Furthermore, herein, the second lens group II can be collectively moved to the object side with a relative lens positional relation maintained or the individual lenses thereof can be separately moved.

Further, for focusing on an object in a close range from infinity, the second lens group II is configured to move to the object side while an interval between the second front and rear lens groups V, VI are shortened. Therefore, the moving speed of the second rear lens group VI is faster than that of the second front lens group V. Also, the interval between them is shorter than when focusing on an object at infinity.

Further, when focusing on an object in a close range from infinity, the first lens group I is configured to move to the image side while the second lens group II is configured to move to the object side. Accordingly, the first lens group I can be prevented from protruding to the object side. It is therefore possible to realize a compact-size digital camera incorporating this optical imaging system 10 without a change in amount of protrusion of the lens barrel unit when focusing.

Further, the second lens group II having a positive optical power can exert the advantages of the retrofocus type lens system that the exit pupil position is distanced away from the image plane to make ambient light incident on an image sensor at a substantially vertical angle, since it moves to the object side when focusing.

Further, when focusing on an object in a close range from infinity, height of a light beam passing through the second lens group II changes along with the movement of the second lens group II to the object side. This causes a tilt of the image plane. In the optical imaging system 10, the tilt of the image plane is corrected by moving the first lens group I to the image side.

The first lens group I does not need to move continuously for focusing on an object in a close range from infinity. It can be configured to change the position on the optical axis when focusing an object in a closer distance than a predetermined distance or when a certain shooting mode is selected.

Moreover, the tilt of the image plane caused by the movement of the second lens group II can be corrected by moving the first lens group I, and field curvature due to manufacture errors or the like can be also adjusted by moving the first lens group I along the optical axis.

Further, the first lens group I can have either of positive optical power and negative optical power, increasing the degrees of freedom in which the optical imaging system 10 is designed.

The first lens group I of the optical imaging system 10 is configured to function as a wide converter attached to the second lens group II. It is made possible to secure sufficient angle of view and correct various aberrations such as spherical aberration at the same time by the first lens group I configured of the first front lens group III having a negative refraction and the first rear lens group IV having a positive refraction in this order from the object side with a relatively large interval in-between them.

Further, it is preferable that the first rear lens group IV is configured to face the second front lens group V via the aperture diaphragm S. With such a configuration, it is also made possible to correct coma aberration by balanced positive refraction of both of the first rear lens group IV and the second front lens group V.

The optical imaging system 10 according to the present invention comprises the first lens group I having the first front and rear lens groups and the second lens group II having the second front and rear lens groups. The second front lens group V mainly assumes image forming action and aberration correction. The second front lens group V can be configured to be a triplet type with positive, negative, and positive refractions or four single lenses with positive, negative, negative, and positive refractions. It can also be configured of four single lenses with positive, negative, negative, and positive refractions as in a later-described embodiment.

The aperture diaphragm S is disposed on the object side of the second front lens group V so that heights of an off-axial light beam passing through the pair of the first positive and negative lenses and an off-axial light beam passing through the pair of the second negative and positive lenses are made different. This makes it possible to effectively reduce both of on-axis chromatic aberration and chromatic aberration of magnification.

By providing the two (first and second) negative lenses in the center instead of one negative lens of the triplet lens, the shape of the second negative lens can be more freely designed to reduce a color difference in coma aberration.

In the second rear lens group VI the lenses are optimally arranged with their respective properties of aberration taken into consideration and in order to optimally set the exit pupil distance. The second rear lens group VI having a positive refraction can increase the exit pupil distance. It can be also configured to have a negative refraction to shorten the total lens length when a longer exit pupil distance is not needed. Moreover, including an aspherical lens in the second rear lens group VI makes it possible to more effectively correct coma aberration.

General rear focusing, i.e., moving only the second rear lens group VI in the optical imaging system 10 is likely to cause a problem of large field curvature due to the aspherical lens included therein. In order to prevent this, the entire second lens group II is collectively moved.

When focusing an object in a close range from infinity, the optical imaging system 10 is configured that an interval between the second front lens group V and the second rear lens group VI is shortened. This can correct spherical aberration caused by the focusing. In this case, moving distances of the second front and rear lens groups are not the same when focusing in a close range. The interval therebetween does not have to continuously change while focusing on an object in a close range. It can be configured that the position of the second front lens group V is changed when focusing on an object in a closer distance than a predetermined distance or the interval can be changed only when a certain shooting mode is selected. Needless to say that it is able to more effectively correct field curvature by moving the first lens group I to the image side and shortening the interval at the same time.

The first lens group I having the first front and rear lens groups is preferable to further include an aspherical lens. The aspherical lenses of the first front lens group III and the second rear lens group VI can complement with each other to more effectively correct aberrations.

By incorporating the optical imaging system 10 into a camera device, a system for containing the second lens group II can be also used for a focusing system, realizing a compact lens containing system in which a rear focus portion and intervals between the lens groups are shortened during non-use.

Such a camera device including the optical imaging system 10 is configured to have a function to convert a captured image into digital data. It can be implemented as a digital camera, a video camera, or a silver film camera.

In the following, the first to third conditions used in the optical imaging system of the present invention are described.

The first to third conditions are commonly used in focusing on an object in a close range from infinity by moving the first lens group I to the image side and the second lens group II to the object side as well as by moving the second lens group II to the object side.

In the first condition, $-0.2<f/fI<0.4$, when f/fI (f: the focal length of the entire system, fI: focal length of the first lens group) is below the lower limit, spherical aberration and the like are increased as the imaging system is focusing an object in a close range. Meanwhile, when f/fI exceeds the upper limit, the moving amount of the second lens group is too large and it becomes difficult to correct aberration in a close range.

Preferably, parameters of the first condition are set as follows:

$$-0.1<f/fI<0.2$$

In the second condition, $0.3<D\_S2/D\_1S<2.0$, when $D\_S2/D\_1S$ ($D\_1S$ is an interval between the first lens group I and the aperture diaphragm S and $D\_2S$ is an interval between the second lens group II and the aperture diaphragm S) exceeds the upper limit, height of an off-axial light beam passing through the second lens group is increased, which makes it difficult to correct off-axial aberration in the second lens group II. Oppositely, when $D\_S2/D\_1S$ is below the lower limit, the height of an off-axial light beam passing through the first lens group I is increased, leading to increasing the size of the optical imaging system and making it difficult to correct off-axial aberration in the first lens group I.

Preferably, parameters of the second condition are set as follows:

$$0.5<D\_S2/D1S<1.5$$

In the third condition, $0.5<D\_12/f<2.5$, when $D\_12/f$ ($D\_12$: interval between the first and second lens groups, f: a focal length of the entire optical imaging system) exceeds the upper limit, the interval between the first and second lens groups I, II is widened and the height of an off-axial light beam passing through the first or second lens group is increased too much, which makes it difficult to sufficiently correct off-axial aberration. Oppositely, when $D\_12/f$ is below the lower limit, it is difficult to maintain a sufficient airspace to perform focusing and capture an object in close range.

Preferably, parameters of the third condition are set as follows:

$$1.0<D\_12/f<2.0$$

By setting the first and second lens groups to satisfy the above six conditions, a high-performance optical imaging system can be realized.

The first lens group I is configured to include the first front lens group III including at least two negative lenses on the object side and the first rear lens group IV having at least one positive lens on the image side with a largest airspace in-between them among airspaces in the first lens group. With a relatively large interval between them, the first lens group I can secure the angle of view sufficiently and correct various aberrations such as spherical aberration.

Further, the two negative lenses of the first front lens group III can prevent occurrence of very large aberration on a certain lens and contribute to effectively correcting astigmatism and the like by the total lens system.

Further, setting a lens face with a large curvature on the image side to be aspherical in the first front lens group III makes it possible to effectively correct distortion and coma aberration.

The second lens group II is preferably configured of the second front lens group V having a positive optical power and the second rear lens group VI including at least one aspherical lens. The aspherical lens in the second rear lens group VI can more effectively correct coma aberration.

Further, fixing the position of the aperture diaphragm S on the axial direction at focusing makes a large driving force for the focusing unnecessary.

Moreover, the optical imaging system 10 is configured to correct a tilt of the image plane caused by the second lens group II by moving the first lens group I, and that caused by manufacture errors or else can be also corrected by moving the first lens group I in the optical axis direction.

Figure 16A:
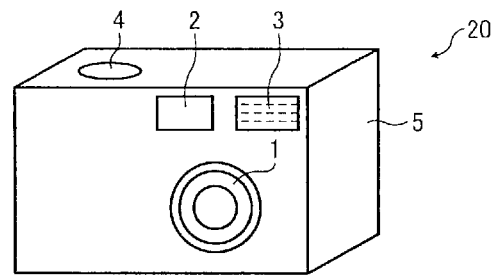
FIG. 16A is a perspective front view of a digital camera as an example of a hand-held data terminal device according to one embodiment and FIG. 16B is a perspective back view of the same.
Figure 16B:
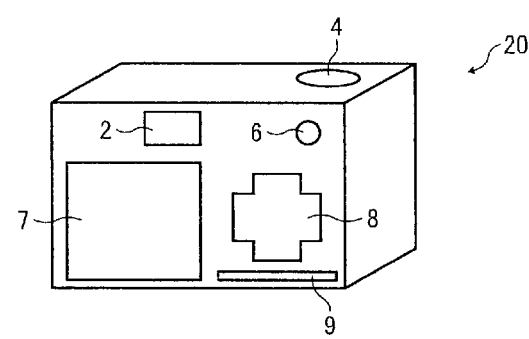

FIGS. 16A, 16B are front and back views of a hand-held data terminal device 20, respectively, using a digital camera as an example. The hand-held data terminal device 20 includes a photographic lens unit 1 as the optical imaging system 10 according to any one of the first to fifth embodiments.

The hand-held data terminal device 20 in FIG. 16 comprises a viewfinder 2, a strobe light portion 3, a shutter button 4, a case 5, a power-on switch 6, a liquid crystal display 7, an operation button 8, and a memory card throttle 9.

Figure 17:
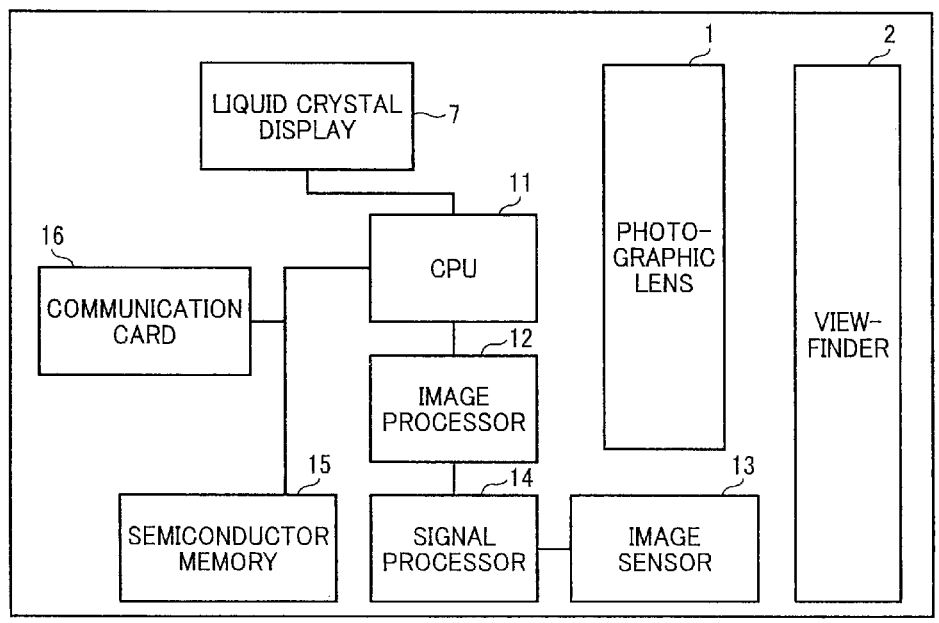
FIG. 17 shows an example of the system configuration of the hand-held data terminal device.

FIG. 17 shows a system configuration of the hand-held data terminal device 20. It includes a light receiving element 13 to receive an optical image of a subject formed by the photographic lens unit 1. Outputs from the light receiving element 13 are processed in a signal processor 14 under the control of a CPU 11 and converted into digital data. In other words, it includes a function to convert a captured image into digital data. Converted digital image data is processed by an image processor 12 under the control of the CPU 11 for image display on the LCD 7 or for storage in a semiconductor memory 15. Photographic operation is done via the operation button 8. Processed images can be transmitted to outside through a communication card or the like which is accommodated in the throttle 9.

The photographic lens unit 1 is collapsed into the case 5 in non-use, protruded upon turning-on of the power-on switch 6 and positioned as shown in FIG. 1 to FIG. 4.

The hand-held data terminal device excluding a communication function of the communication card 16 and the like is a camera device as a photographic unit.

The hand-held data terminal device 20 can be configured to select a focusing system of the present invention via a display menu or the like.

Hereinafter, five examples of the optical imaging system 10 will be described. Numeral codes and symbols used hereinafter denote as follows:

Si: i-th lens face from the object side
f: total focal length of lens system
F: F-number
ω: half field of angle (degree)
Y': maximum image height
Ri: curvature radius of i-th lens face from the object side
Di: interval between i-th lens face and i+1$^{th}$ lens face on the axis
Ni: refractive index
vi: Abbe number
K: conic constant of aspheric face
A4: fourth order aspheric coefficient
A6: sixth order aspheric coefficient
A8: eighth order aspheric coefficient
A10: tenth order aspheric coefficient The aspheric face is expressed by the following known formula:

$$X = CH^2/[1+\sqrt{(1-(1+K)C^2H^2)}] + A4 \cdot H^4 + A6 \cdot H^6 + A8 \cdot H^8 + A10 \cdot H^{10} \ldots$$

where X is a depth in the optical axis direction, C is a paraxial curvature (inverse of paraxial curvature radius), H is height from the optical axis, K is a conic constant of aspheric face, and A4 to A10 are high-order aspheric coefficients.

First Embodiment

The following table 1 shows specific data on the first to 8$^{th}$ lenses L1 to L8 of the first and second lens groups I, II in FIG. 1 when f=5.99, F=1.99, ω=39.3, Y'=4.8.

TABLE 1

| Si | Ri | Di | Ni | vi | GLASS |
|---|---|---|---|---|---|
| 1 | 35.082 | 1.20 | 1.43875 | 94.94 | SFPL53(OHARA) |
| 2 | 6.700 | 2.00 | | | |
| 3 | 11.715 | 1.20 | 1.51633 | 64.06 | LBSL7(OHARA) |
| 4* | 5.000 | 10.95 | | | |
| 5 | 17.371 | 1.65 | 1.69350 | 53.18 | LLAL13(OHARA) |
| 6* | −33.957 | VARIABLE (A) | | | |
| 7 | DIAPHGRAM | VARIABLE (B) | | | |
| 8 | 27.431 | 2.24 | 1.43875 | 94.94 | SFPL53(OHARA) |
| 9 | −9.000 | 1.00 | 1.71736 | 29.52 | STIH1(OHARA) |
| 10 | −18.032 | 0.20 | | | |
| 11 | 20.912 | 1.00 | 1.71736 | 29.52 | STIH1(OHARA) |
| 12 | 8.886 | 2.34 | 1.60300 | 65.44 | SPHM53(OHARA) |
| 13 | −82.844 | 3.45 | | | |
| 14* | 21.208 | 1.25 | 1.51633 | 64.06 | LBSL7(OHARA) |
| 15 | 132.896 | VARIABLE (C) | | | |
| 16 | 0.000 | 1.24 | 1.50000 | 64.00 | |
| 17 | 0.000 | | | | |

In the table 1 and the following tables asterisk * indicates that the lens face is aspheric.

In the table 1 and following tables asterisk * indicates that the lens face is aspheric.

Aspheric Coefficient

Fourth Face

K=−0.82391, A4=8.44238E−05, A6=−1.00402E−05, A8=2.96784E−07, A10=−1.02358E−08

Sixth Face

A4=3.19453E−05, A6=−1.90098E−06, A8=1.59520E−07, A10=−4.45055E−09

Fourteenth Face

K=−26.92849, A4=−1.76448E−05, A6=−8.17352E−06, A8=6.90928E−08, A10=−1.17272E−09

Note that in the present and following embodiments values such as "6.90928E−08" denote "6.90928×10$^{−8}$".

Table 2 shows variable intervals A to C between lens faces.

TABLE 2

| | Inf. | 300 mm |
|---|---|---|
| A | 3.81 | 3.73 |
| B | 4.19 | 4.05 |
| C | 5.37 | 5.51 |

Table 3 shows parameters of the first to third conditions.

TABLE 3

| f/f1 | 0.161 |
|---|---|
| D_S2/D_1S | 1.100 |
| D_12/f | 1.336 |

Second Embodiment

The following table 4 shows specific data on the first to 8$^{th}$ lenses L1 to L8 of the first and second lens groups I, II in FIG. 2 when f=5.98, F=2.03, ω=39.3, Y'=4.8.

TABLE 4

| Si | Ri | Di | Ni | vi | GLASS |
|---|---|---|---|---|---|
| 1 | 30.355 | 1.20 | 1.43875 | 94.94 | SFPL53(OHARA) |
| 2 | 6.700 | 2.29 | | | |
| 3 | 13.832 | 1.20 | 1.51633 | 64.06 | LBSL7(OHARA) |
| 4* | 5.000 | 9.48 | | | |
| 5 | 18.805 | 1.79 | 1.69350 | 53.18 | LLAL13(OHARA) |
| 6* | −27.648 | VARIABLE (A) | | | |
| 7 | DIAPHGRAM | VARIABLE (B) | | | |
| 8 | 26.537 | 2.19 | 1.43875 | 94.94 | SFPL53(OHARA) |
| 9 | −9.000 | 1.00 | 1.71736 | 29.52 | STIH1(OHARA) |
| 10 | −20.855 | 0.20 | | | |
| 11 | 23.697 | 1.00 | 1.71736 | 29.52 | STIH1(OHARA) |
| 12 | 10.430 | 2.39 | 1.60300 | 65.44 | SPHM53(OHARA) |
| 13 | −28.971 | 3.42 | | | |
| 14* | 15.605 | 1.21 | 1.51633 | 64.06 | LBSL7(OHARA) |
| 15 | 33.725 | VARIABLE (C) | | | |
| 16 | 0.000 | 1.24 | 1.50000 | 64.00 | |
| 17 | 0.000 | | | | |

Aspheric Coefficient
  Fourth Face
    K=−0.82391, A4=3.31963E-05, A6=−2.95366E-06, A8=−1.27633E-07, A10=−1.85327E-09
  Sixth Face
    A4=2.42187E-05, A6=−1.63597E-06, A8=1.14965E-07, A10=−2.86332E-09
  Fourteenth Face
    K=−26.92849, A4=4.83215E-04, A6=−2.95824E-05, A8=7.23757E-07, A10=−1.04774E-08

Table 5 shows variable intervals A to C of the lens faces.

TABLE 5

| | Inf. | 300 mm |
|---|---|---|
| A | 4.99 | 4.89 |
| B | 3.96 | 3.82 |
| C | 5.52 | 5.66 |

Table 6 shows parameters of the first to third conditions.

TABLE 6

| | |
|---|---|
| f/f1 | 0.112 |
| D_S2/D_1S | 0.794 |
| D_12/f | 1.497 |

Third Embodiment

The following table 7 shows specific data on the first to 8$^{th}$ lenses L1 to L8 of the first and second lens groups I, II in FIG. 3 according to the third embodiment when f=6.00, F=1.92, ω=39.1, Y'=4.8.

TABLE 7

| Si | Ri | Di | Ni | vi | GLASS |
|---|---|---|---|---|---|
| 1 | 19.577 | 1.40 | 1.48749 | 70.24 | SFSL5(OHARA) |
| 2 | 6.882 | 2.97 | | | |
| 3 | 18.068 | 1.20 | 1.51633 | 64.06 | LBSL7(OHARA) |
| 4* | 4.857 | 7.53 | | | |
| 5 | 16.166 | 2.83 | 1.81600 | 46.62 | SLAH59(OHARA) |
| 6 | −80.665 | VARIABLE (A) | | | |
| 7 | DIAPHGRAM | VARIABLE (B) | | | |
| 8 | 31.044 | 2.38 | 1.49700 | 81.54 | SFPL51(OHARA) |
| 9 | −9.021 | 1.00 | 1.75520 | 27.51 | STIH4(OHARA) |
| 10 | −28.716 | 0.20 | | | |
| 11 | 12.570 | 1.00 | 1.65412 | 39.68 | SNBH5(OHARA) |
| 12 | 9.133 | 2.92 | 1.49700 | 81.54 | SFPL51(OHARA) |
| 13 | −38.916 | 2.76 | | | |
| 14* | 17.751 | 1.45 | 1.51633 | 64.06 | LBSL7(OHARA) |
| 15 | 157.840 | VARIABLE (C) | | | |
| 16 | 0.000 | 1.24 | 1.50000 | 64.00 | |
| 17 | 0.000 | | | | |

Aspheric Coefficients
  Fourth Face
    K=−0.91019, A4=3.36386E-05, A6=−4.47956E-06 A8=−5.01228E-08, A10=−2.17344E-09
  Fourteenth Face
    K=0.0, A4=−3.03909E-04, A6=1.01354E-06, A8=−8.67386E-08, A10=1.00498E-09

Table 8 shows variable intervals A to C between the lens faces.

TABLE 8

| | Inf. | 300 mm |
|---|---|---|
| A | 5.89 | 5.79 |
| B | 5.48 | 5.34 |
| C | 6.35 | 6.49 |

Table 9 shows parameters of the first to third conditions.

TABLE 9

| | |
|---|---|
| f/f1 | −0.020 |
| D_S2/D_1S | 0.930 |
| D_12/f | 1.895 |

Fourth Embodiment

The following table 10 shows specific data on the first to 8$^{th}$ lenses L1 to L8 of the first and second lens groups I, II in FIG. 4 when f=6.00, F=1.92, ω=39.1, Y'=4.8.

TABLE 10

| Si | Ri | Di | Ni | vi | GLASS |
|---|---|---|---|---|---|
| 1 | 21.977 | 1.20 | 1.48749 | 70.24 | SFSL5(OHARA) |
| 2 | 7.174 | 2.56 | | | |
| 3 | 14.459 | 1.20 | 1.51633 | 64.06 | LBSL7(OHARA) |
| 4* | 4.641 | 8.21 | | | |
| 5 | 15.107 | 1.79 | 1.81600 | 46.62 | SLAH59(OHARA) |
| 6 | −86.292 | VARIABLE (A) | | | |
| 7 | DIAPHGRAM | VARIABLE (B) | | | |
| 8 | 33.384 | 1.91 | 1.49700 | 81.54 | SFPL51(OHARA) |
| 9 | −8.300 | 1.00 | 1.75520 | 27.51 | STIH4(OHARA) |
| 10 | −23.278 | 0.20 | | | |
| 11 | 12.189 | 1.00 | 1.62588 | 35.70 | STIM1(OHARA) |
| 12 | 8.277 | 2.41 | 1.49700 | 81.54 | SFPL51(OHARA) |

TABLE 10-continued

| Si | Ri | Di | Ni | vi | GLASS |
|---|---|---|---|---|---|
| 13 | −67.660 | 2.94 | | | |
| 14* | 14.303 | 1.37 | 1.51633 | 64.06 | LBSL7(OHARA) |
| 15 | 50.393 | VARIABLE (C) | | | |
| 16 | 0.000 | 1.24 | 1.50000 | 64.00 | |
| 17 | 0.000 | | | | |

Aspheric Coefficients
 Fourth Face
  K=−0.85391, A4=1.14455E-04, A6=−4.25901E-06, A8=−1.59355E-08, A10=−2.97123E-09
 Fourteenth Face
  K=0.0, A4=−3.89523E-04, A6=2.62694E-06, A8=−1.62806E-07, A10=1.73934E-09

Table 11 shows variable intervals A to C between the lens faces.

TABLE 11

| | Inf. | 300 mm |
|---|---|---|
| A | 6.12 | 6.02 |
| B | 3.82 | 3.68 |
| C | 5.52 | 5.66 |

Table 12 shows parameters of the first to third conditions.

TABLE 12

| f/f1 | 0.052 |
|---|---|
| D_S2/D_1S | 0.624 |
| D_12/f | 1.657 |

Figure 5:
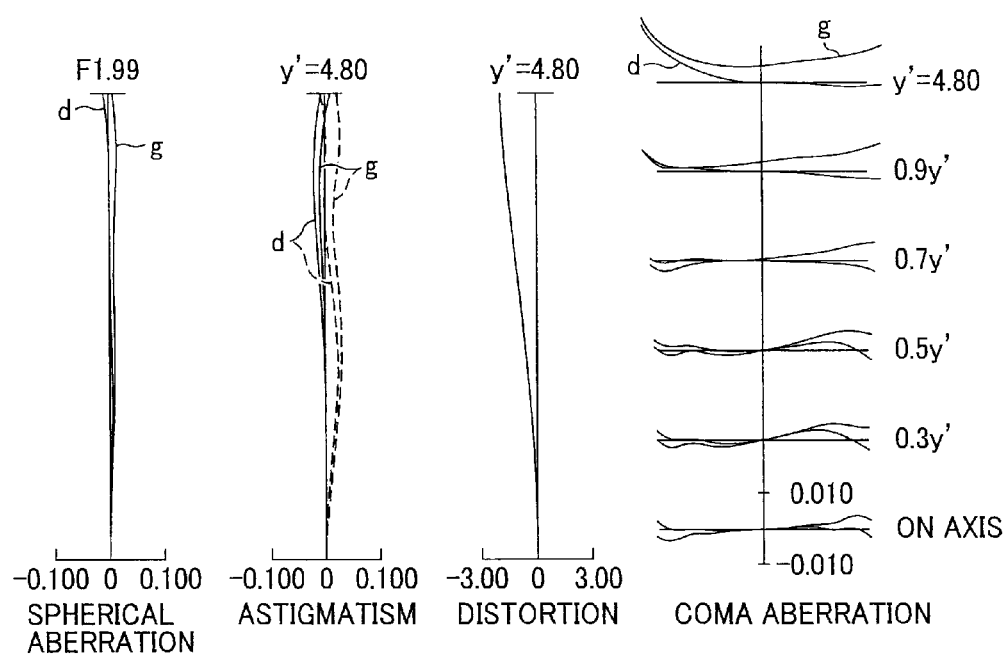
FIG. 5 shows aberration curves of the optical imaging system of the first embodiment when focusing on an object at infinity.

FIGS. 5 to 12 show aberration curves of the optical imaging system 10 according to the first to fourth embodiments. FIG. 5 shows aberration curves of the optical imaging system 10 of the first embodiment when focusing on an object at infinity, FIG. 6A shows the same when focusing on an object in a position 300 mm away from an image plane by moving only the second lens group II, and FIG. 6B shows the same by moving both the first and second lens groups I, II.

In the drawings, d denotes a D line and g denotes a G line. In the spherical aberration, the broken line indicates sine condition, and in the astigmatism, the solid line indicates sagittal light beam and the broken line indicates meridional light beam.

Figure 7:
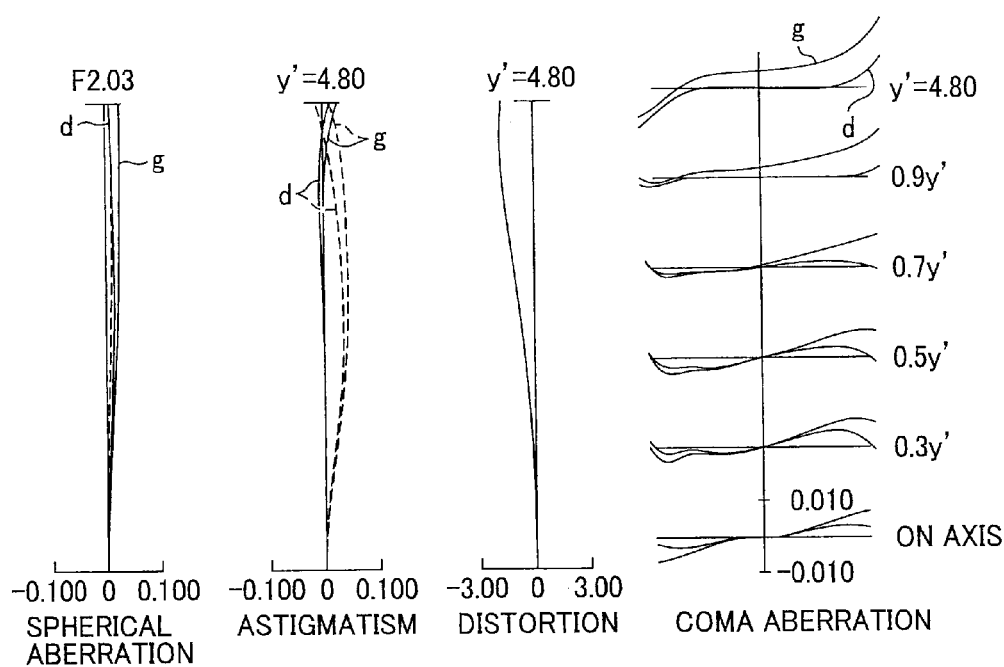
FIG. 7 shows aberration curves of the optical imaging system of the second embodiment when focusing on an object at infinity.
Figure 8A:
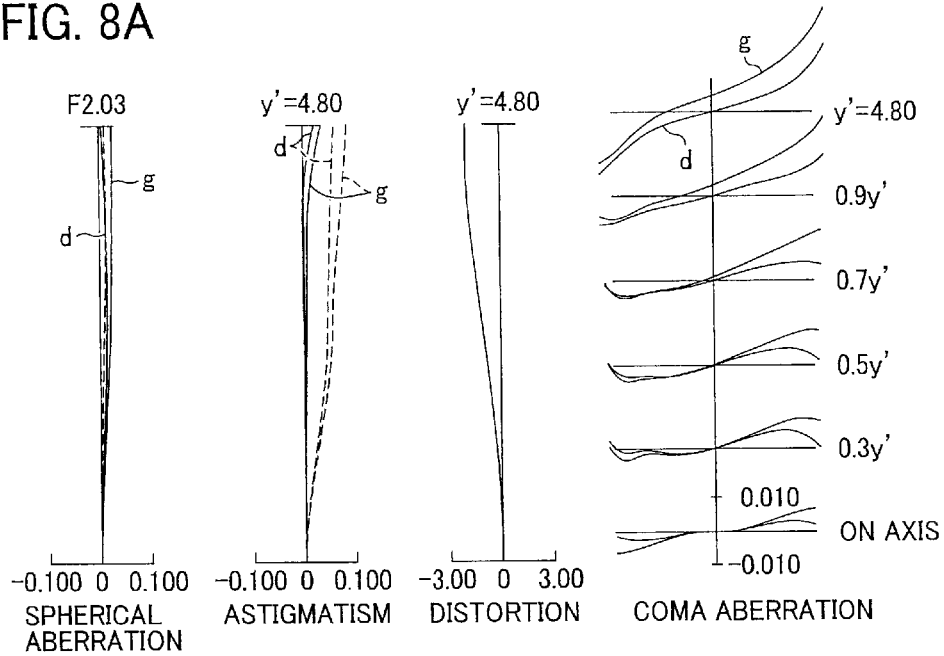
FIG. 8A shows aberration curves of the optical imaging system of the second embodiment when focusing on an object in a position 300 mm away from an image plane by moving only the second lens group.
Figure 8B:
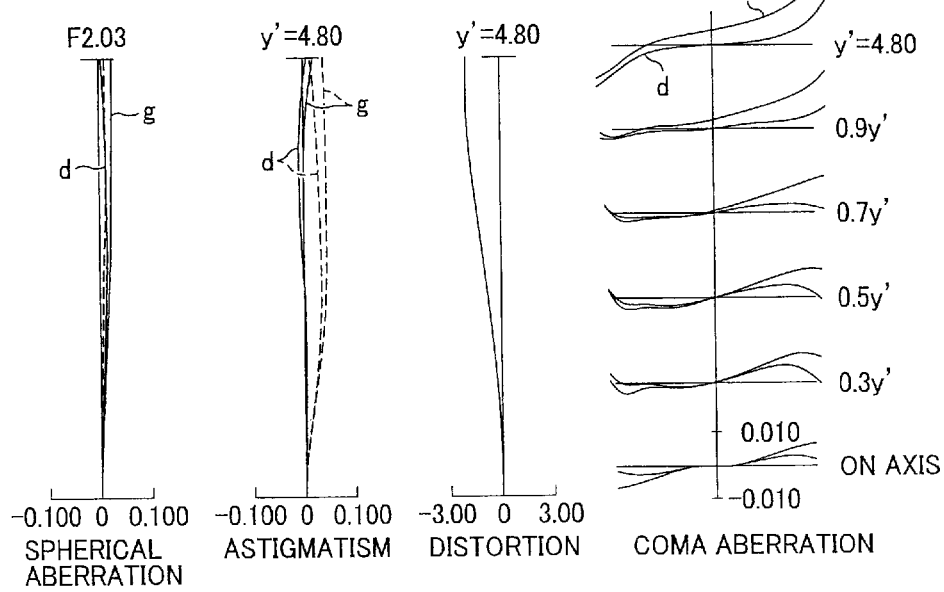
FIG. 8B shows the same by moving both the first and second lens groups.

FIG. 7 shows aberration curves of the optical imaging system 10 of the second embodiment when focusing on an object at infinity. FIG. 8A shows aberration curves of the optical imaging system 10 of the second embodiment when focusing on an object in a position 300 mm away from an image plane by moving only the second lens group II, and FIG. 8B shows the same by moving both the first and second lens groups I, II.

Figure 9:
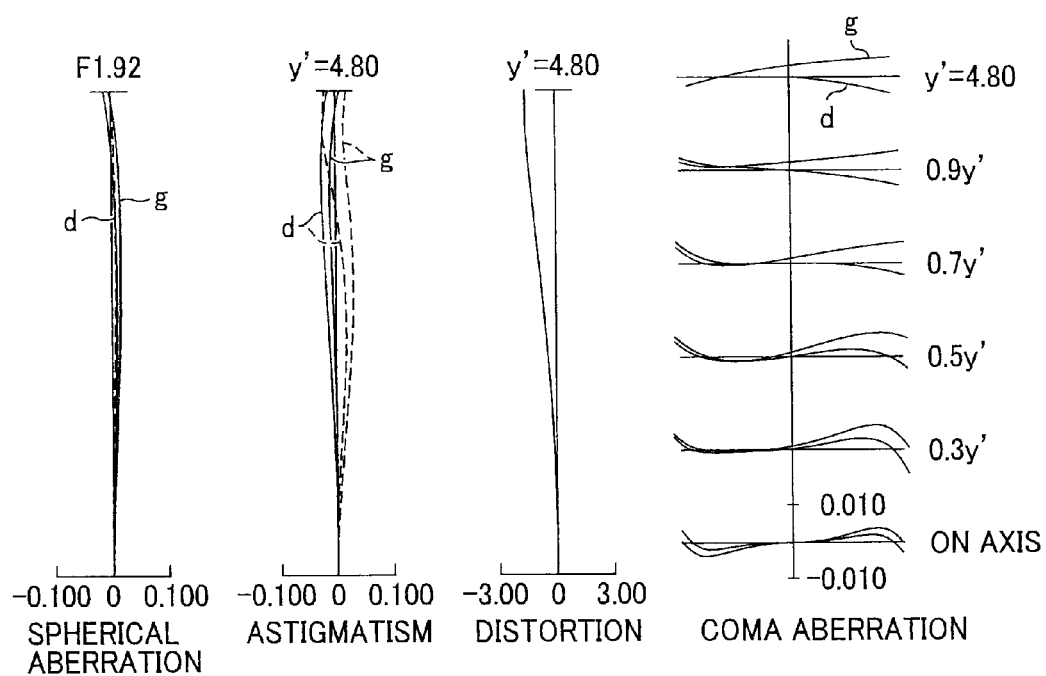
FIG. 9 shows aberration curves of the optical imaging system of the third embodiment when focusing on an object at infinity.
Figure 10A:
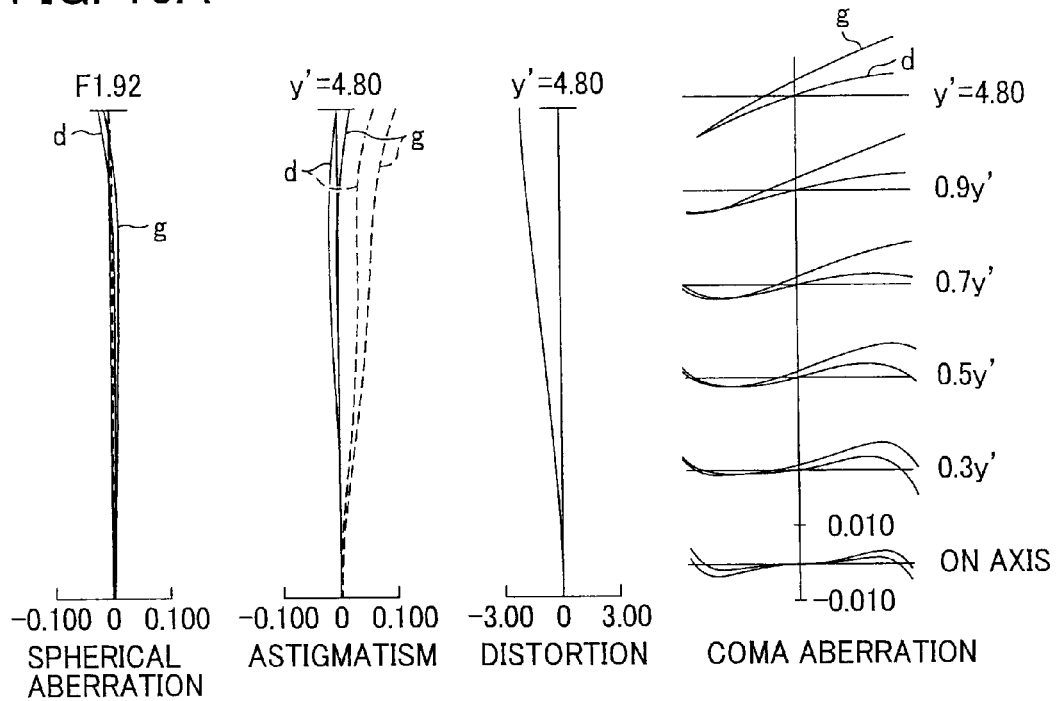
FIG. 10A shows aberration curves of the optical imaging system of the third embodiment when focusing on an object in a position 300 mm away from an image plane by moving only the second lens group.
Figure 10B:
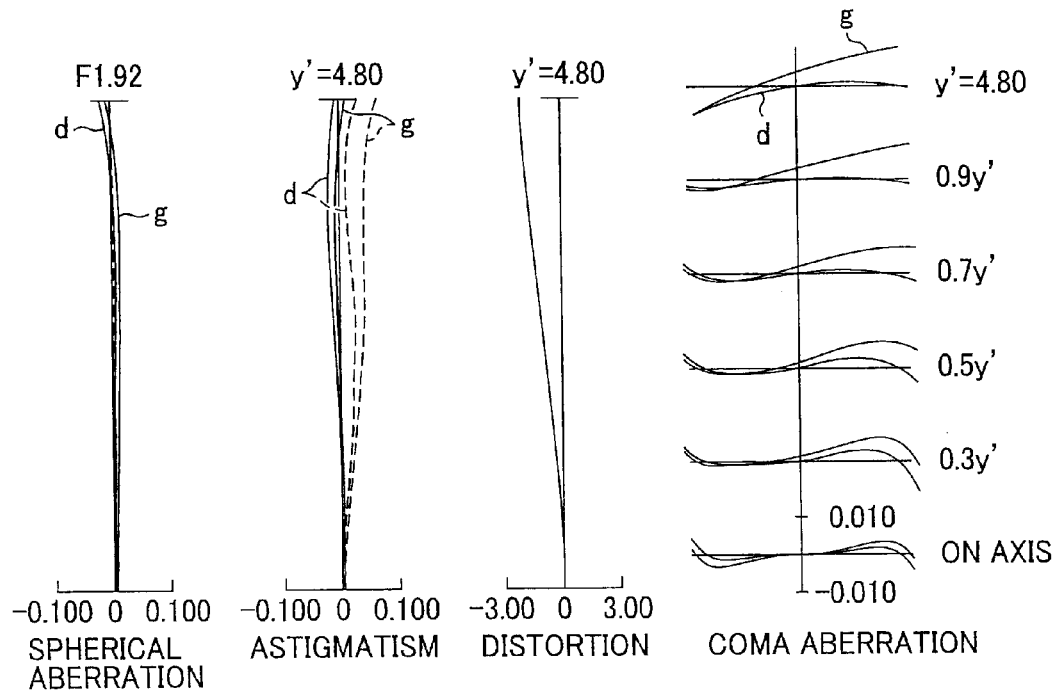
FIG. 10B shows the same by moving both the first and second lens groups.

FIG. 9 shows aberration curves of the optical imaging system 10 of the third embodiment when focusing on an object at infinity. FIG. 10A shows aberration curves of the optical imaging system 10 of the third embodiment when focusing on an object in a position 300 mm away from an image plane by moving only the second lens group II, and FIG. 10B shows the same by moving both first and second lens groups I, II.

Figure 11:
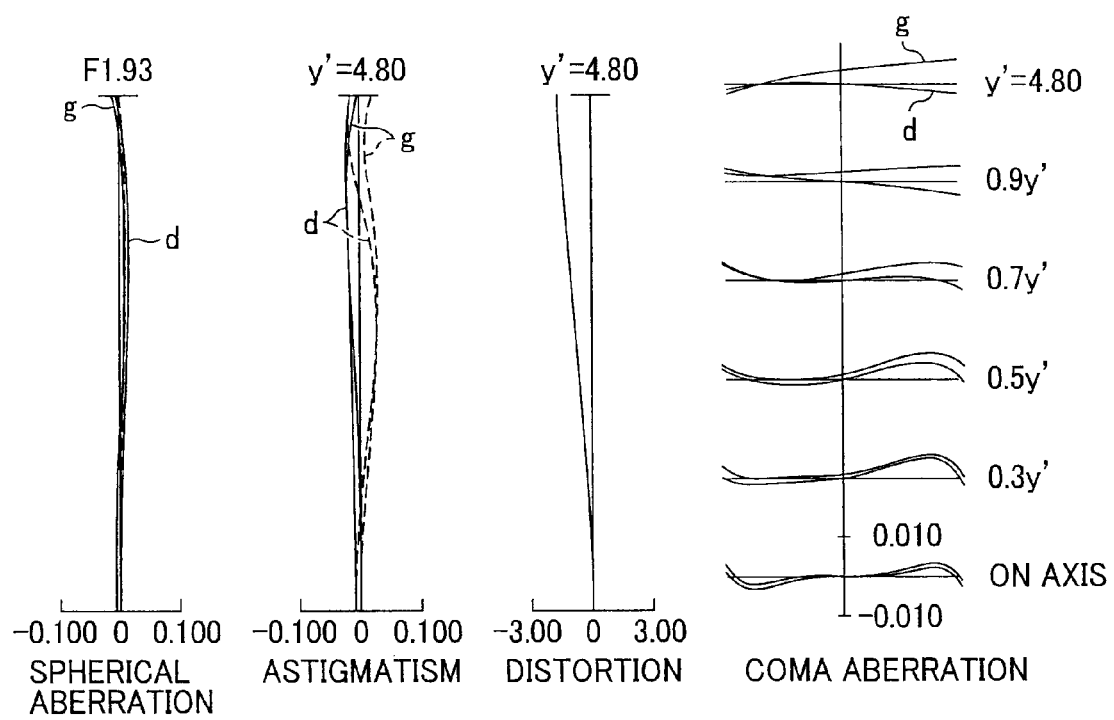
FIG. 11 shows aberration curves of the optical imaging system of the fourth embodiment when focusing on an object at infinity.
Figure 12A:
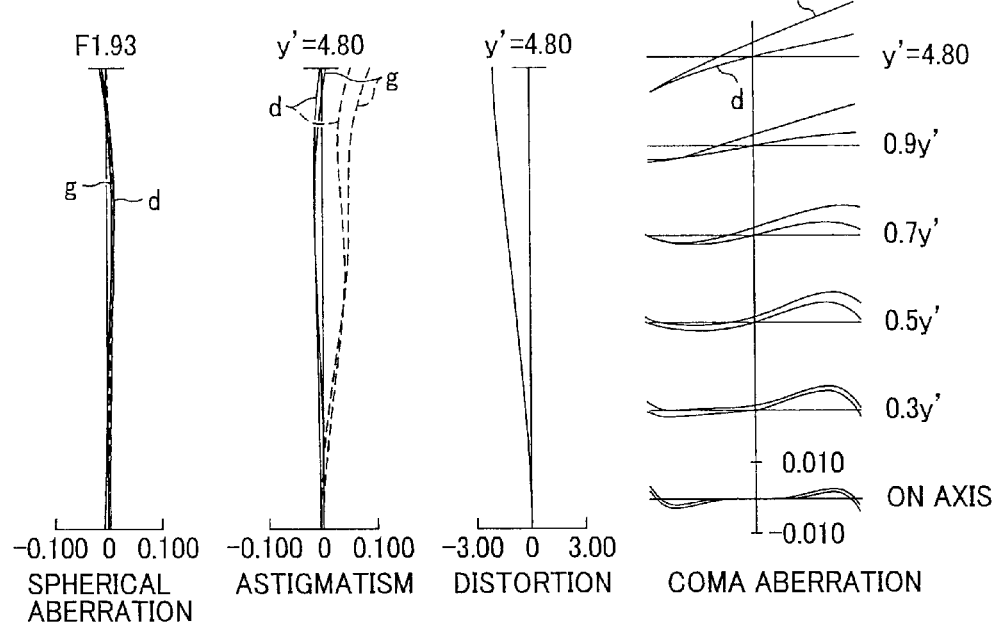
FIG. 12A shows aberration curves of the optical imaging system of the fourth embodiment when focusing on an object in a position 300 mm away from an image plane by moving only the second lens group.
Figure 12B:
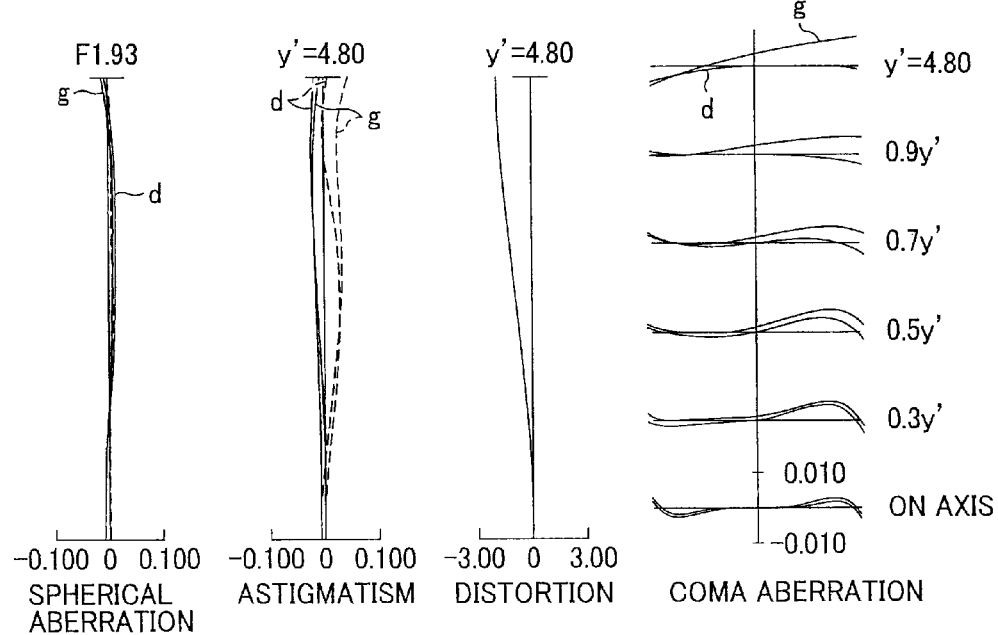
FIG. 12B shows the same by moving both the first and second lens groups.

FIG. 11 shows aberration curves of the optical imaging system 10 of the fourth embodiment when focusing on an object at infinity. FIG. 12A shows aberration curves of the optical imaging system 10 of the fourth embodiment when focusing on an object in a position 300 mm away from an image plane by moving only the second lens group II, and FIG. 12B shows the same by moving both first and second lens groups I, II.

As seen from the above aberration curves in the drawings, aberrations are sufficiently corrected in any of the first to fourth embodiments. The optical imaging system 10 according to any of the first to fourth embodiments can be configured to be downsized, large-aperture lens system with a half field of angle of 38 degrees or more and f-number being 2.0 or less and can exert an excellent image performance even when an object is in a close range.

By moving both the first and second lens groups I, II to focus on an object in a close range in the first to fourth embodiments, a tilt of the image plane is more reduced than by moving only the second lens group II (rear focusing in FIG. 6A, FIG. 8A, FIG. 10A, FIG. 12A).

As apparent from comparing the aberration curves in FIGS. 6A, 8A, 10A, 12A and those in FIGS. 6B, 8B, 10B, 12B, aberrations occurring when focusing on an object 300 mm away from the image plane are corrected sufficiently. A tilt of the image plane can be more corrected by moving the first lens group I to the image side and the second lens group II to the object side than by the rear focusing.

However, from practical point of view, the levels of correction achieved by moving both the first and second lens groups I, II and moving only the second lens group II are substantially the same when focusing on an object 300 mm away from the image plane. Therefore, focusing by moving only the second lens group II can attain practically sufficient effects.

Fifth Embodiment

Another example of the optical imaging system 10 according to the first embodiment is described as a fifth embodiment. A difference between the first and fifth embodiments is in that the interval C between the second front and rear lens groups (lens faces 13 and 14) is variable. All the other specific data on the lenses are the same as those in the first embodiment. The variable (D) in the table 13 is the same as the variable (C) in the table 1.

Specific data on the optical imaging system 10 according to the fifth embodiment is shown in the table 13.

TABLE 13

| Si | Ri | Di | Ni | vi | GLASS |
|---|---|---|---|---|---|
| 1 | 35.082 | 1.20 | 1.43875 | 94.94 | SFPL53(OHARA) |
| 2 | 6.700 | 2.00 | | | |
| 3 | 11.715 | 1.20 | 1.51633 | 64.06 | LBSL7(OHARA) |
| 4* | 5.000 | 10.95 | | | |
| 5 | 17.371 | 1.65 | 1.69350 | 53.18 | LLAL13(OHARA) |
| 6* | −33.957 | VARIABLE (A) | | | |
| 7 | DIAPHGRAM | VARIABLE (B) | | | |
| 8 | 27.431 | 2.24 | 1.43875 | 94.94 | SFPL53(OHARA) |
| 9 | −9.000 | 1.00 | 1.71736 | 29.52 | STIH1(OHARA) |
| 10 | −18.032 | 0.20 | | | |
| 11 | 20.912 | 1.00 | 1.71736 | 29.52 | STIH1(OHARA) |
| 12 | 8.886 | 2.34 | 1.60300 | 65.44 | SPHM53(OHARA) |
| 13 | −82.844 | VARIABLE (C) | | | |
| 14* | 21.208 | 1.25 | 1.51633 | 64.06 | LBSL7(OHARA) |
| 15 | 132.896 | VARIABLE (D) | | | |

TABLE 13-continued

| Si | Ri | Di | Ni | vi | GLASS |
|---|---|---|---|---|---|
| 16 | 0.000 | 1.24 | 1.50000 | 64.00 | |
| 17 | 0.000 | | | | |

Table 14 shows specific data on the variable intervals A to D in different focus conditions, a to f and infinity.

TABLE 14

| | Inf. | a | b | c | d | e | f |
|---|---|---|---|---|---|---|---|
| A | 3.81 | 3.81 | 3.73 | 3.81 | 3.81 | 3.31 | 3.81 |
| B | 4.19 | 4.05 | 4.05 | 3.51 | 3.57 | 3.57 | 4.19 |
| C | 3.45 | 3.45 | 3.45 | 3.45 | 3.25 | 3.25 | 3.02 |
| D | 5.37 | 5.51 | 5.51 | 6.05 | 6.19 | 6.19 | 5.80 |

In the table 14 "Inf." shows values of the variable intervals when the imaging system focuses on an object at infinity. "a" shows the same when the imaging system focuses on an object 300 mm away from the image plane by moving only the second lens group II. "b" shows the same when the imaging system focuses an object 300 mm away from the image plane by moving the first and second lens groups I, II. "c" shows the same when the imaging system focuses on an object 90 mm away from the image plane by moving only the second lens group II. "d" shows the same when the imaging system focuses on an object 90 mm away from the image plane by moving only the second lens group II while an interval between the second front and rear lens groups is shortened. "e" shows the same when the imaging system focuses on an object 90 mm away from the image plane by moving the second lens group II while the interval between the second front and rear lens groups is shortened and by moving the first lens group I. "f" shows the same when the imaging system focuses on an object 300 mm away from the image plane by moving only the second rear lens group VI (rear focusing).

Figure 6A:
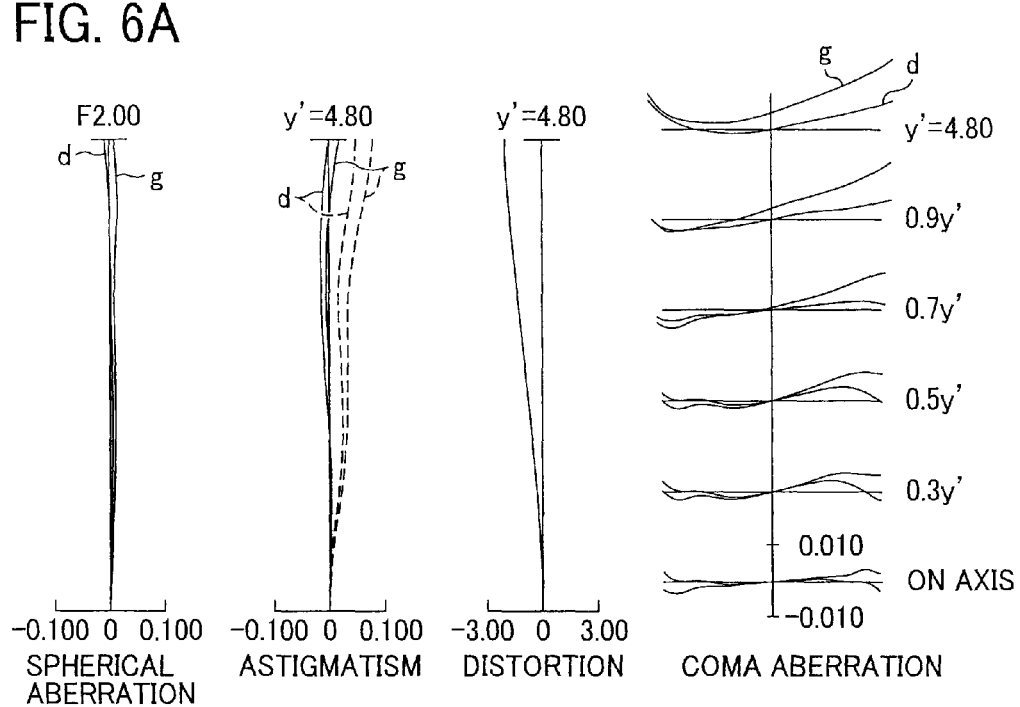
FIG. 6A shows aberration curves of the optical imaging system of the first embodiment when focusing on an object in a position 300 mm away from an image plane by moving only a second lens group II.
Figure 6B:
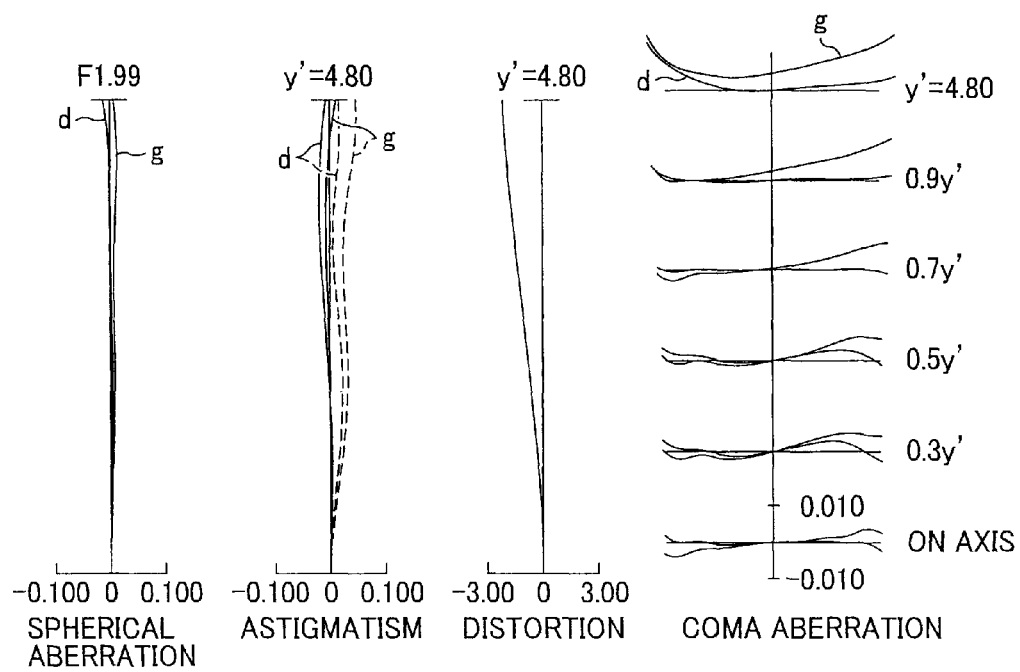
FIG. 6B shows the same by moving both first and second lens groups.

The aberration curves in the conditions a and b are the same as those in FIGS. 6A, 6B (first embodiment), respectively. In the conditions a and b each of the first and second lens groups I, II is moved collectively.

Figure 13A:
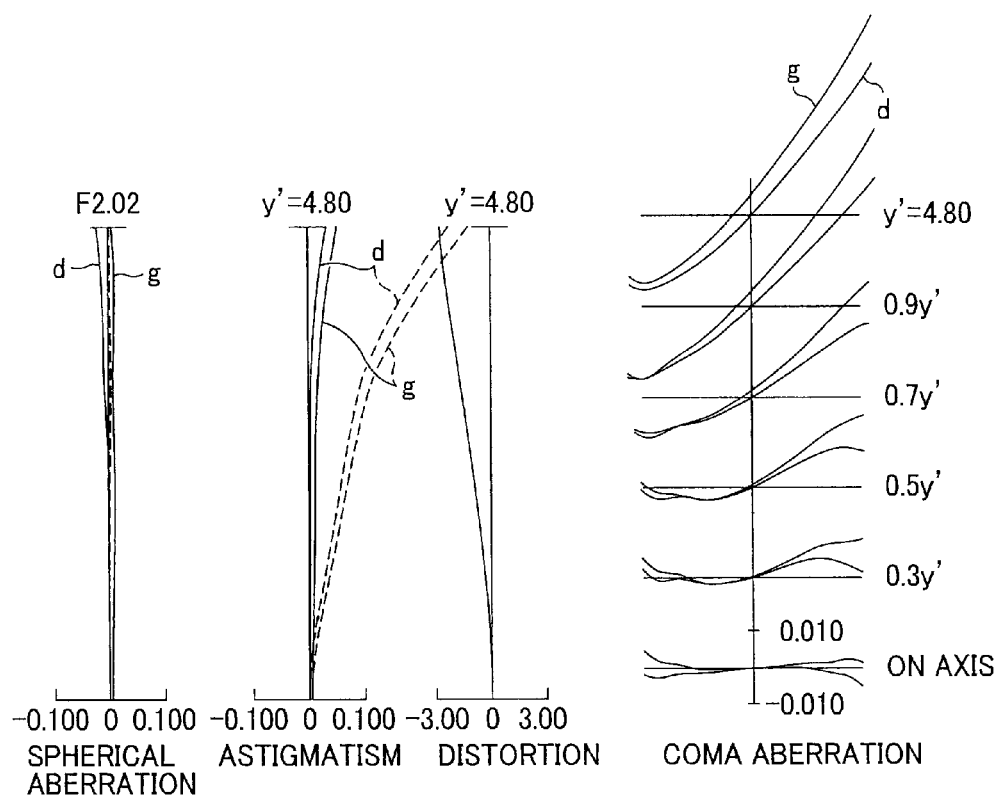
FIG. 13A shows aberration curves of the optical imaging system of the fifth embodiment when focusing on an object in a position 300 mm away from an image plane by collectively moving only the second lens group.
Figure 13B:
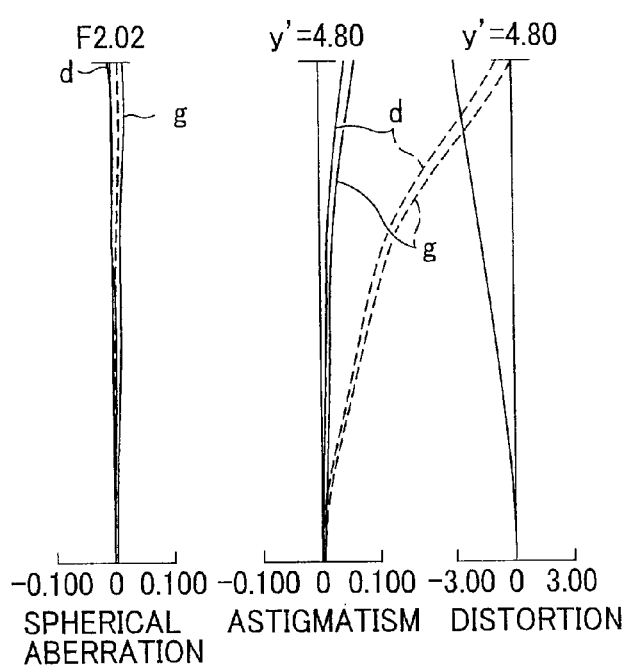
FIG. 13B shows the same by moving only the second lens group such that an interval between the second front and rear lens groups is decreased.
Figure 13B:
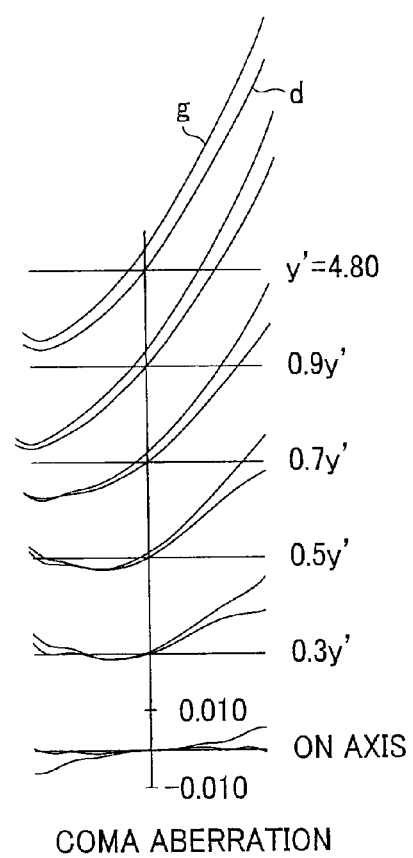

In the condition c, the second lens group II is moved collectively to the object side and the aberration curves are shown in FIG. 13A. In the condition d, the second lens group II is moved to the object side while the interval between the second front and rear lens groups is shortened and the aberration curves are shown in FIG. 13B.

In the conditions c and d, a tilt of the image plane (astigmatism) occurs. However, since an object to be focused on is in a close range of 90 mm away from the image plane, it can be said that the correction level is practically sufficient.

Figure 14:
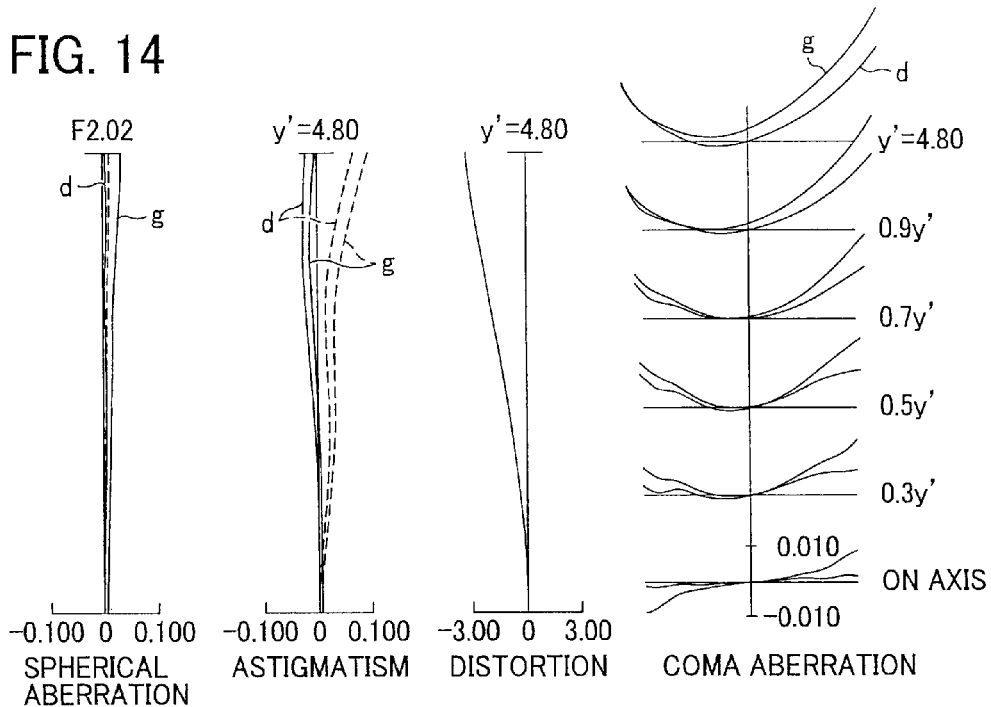
FIG. 14 shows aberration curves of the optical imaging system of the fifth embodiment when focusing on an object in a position 90 mm away from an image plane by moving the second lens group to the image side and moving the second lens group to the object side such that an interval between the second front and rear lens groups is decreased.

In the condition e, an object in a position 90 mm away from the image plane is brought into focus by moving the second lens group II to the object side while the interval between the second front and rear lens groups is shortened and by moving the first lens group I to the image side. As shown in the table 14, the movements of the second front and rear lens groups are the same as those in the conditions d. Additionally moving the first lens group I to the image side collectively can correct the tilt of the image plane more effectively than moving the second front and rear lens groups, as shown in FIG. 14.

Figure 15:
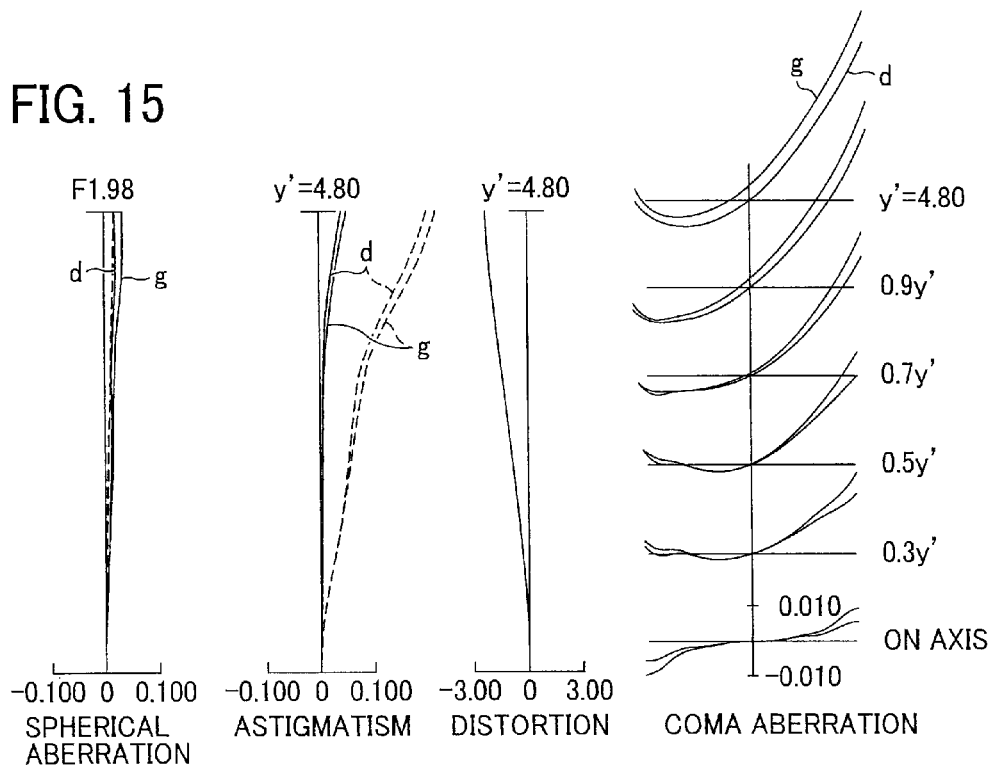
FIG. 15 shows aberration curves of the optical imaging system of the fifth embodiment when focusing on an object in a position 300 mm away from an image plane by moving only the second rear lens group (rear focusing) while the first and second lens groups are at infinity position.

In the condition f, for focusing on an object 300 mm away from the image plane, only the second rear lens group VI is moved to the object side while the first lens group I and the second front lens group V are positioned at infinity. The aberration curves are shown in FIG. 15. It is seen from FIG. 15 that in comparison with FIG. 6A, the tilt of the image plane is slightly increased even with the object's position being 300 mm away from the image plane taken into consideration.

Thus, for focusing on an object in a close rage from infinity, it is effective to collectively move the second lens group II to the object side while the interval between the second front and rear lens groups is shortened, or to move the first lens group I to the image side and the second lens group II to the object side.

As described above, according to the present invention, it is possible to provide a novel, wide angle, large-aperture optical imaging system with a half of angle of view of 38 degrees or more and f-number being 2.0 or less. This high-performance optical imaging system can effectively focus on an object both at infinity and in a close range and be compact in size.

Using such an optical imaging system, compact and high-performance camera device and hand-held data terminal device can be realized.

Although the present invention has been described in terms of exemplary embodiments, it is not limited thereto. It should be appreciated that fluctuations may be made in the embodiments described by persons skilled in the art without departing from the scope of the present invention as defined by the following claims.

What is claimed is:

1. An optical imaging system, comprising:
    a first lens group having a positive or negative optical power, an aperture diaphragm, and a second lens group having a positive optical power arranged in order from an object side, wherein
    the first lens group is comprised of a first front lens group including at least two negative lenses and a first rear lens group having at least one positive lens with an airspace in-between the first front and rear lens groups, the airspace being largest among airspaces in the first lens group;
    the second lens group is comprised of a second front lens group including a first positive lens, a first negative lens, a second negative lens, and a second positive lens arranged in order from the object side, and a second rear lens group including at least one aspherical lens;
    when focusing on an object in a close range from infinity, the second lens group is configured to move to the object side; and
    the first and second lens groups are configured to move in such a manner as to satisfy the following condition when focusing on an object at infinity:
    $0.3 < D\_S2/D\_1S < 2.0$
    where $D\_1S$ is an interval between the first lens group and the aperture diaphragm and $D\_2S$ is an interval between the second lens group and the aperture diaphragm.

2. An optical imaging system according to claim 1, wherein when focusing on an object in a close range from infinity, an interval between the second front and rear lens groups is shortened.

3. An optical imaging system according to claim 1, wherein the first lens group is configured to have such a focal length as to satisfy the following condition:
    $-0.2 < f/f1 < 0.4$
    where f1 is a focal length of the first lens group and f is a focal length of the entire optical imaging system.

4. An optical imaging system according to claim 1, wherein the first and second lens groups are configured to move in such a manner as to satisfy the following condition when focusing on an object at infinity:
    $0.5 < D\_12/f < 2.5$ where D_12 is an interval between the first and second lens groups and f is a focal length of the entire optical imaging system.

5. An optical imaging system according to claim 1, wherein the second rear lens group is comprised of a single aspherical lens.

6. An optical imaging system according to claim 1, wherein the aperture diaphragm is configured to be in a fixed position on an optical axis of the optical imaging system when focusing on an object in a close range.

7. An optical imaging system according to claim 1, wherein the first lens group has a positive optical power.

8. An optical imaging system according to claim 1, wherein the first lens group has a negative optical power.

9. A camera device comprising the optical imaging system according to claim 1.

10. A hand-held data terminal device, comprising the camera device according to claim 9 as a photographic unit.

11. An optical imaging system, comprising:
a first lens group having a positive or negative optical power, an aperture diaphragm, and a second lens group having a positive optical power arranged in order from an object side, wherein
the first lens group is comprised of a first front lens group including at least two negative lenses and a first rear lens group having at least one positive lens with an airspace in-between the first front and rear lens groups, the airspace being largest among airspaces in the first lens group;
when focusing on an object in a close range from infinity, the first lens group is configured to move to an image side while the second lens group is configured to move to the object side; and
the first lens group is configured to have such a focal length as to satisfy the following condition:

$$-0.2 < f/f1 < 0.4$$

where f is a focal length of the first lens group and f1 is a focal length of the entire optical imaging system.

12. An optical imaging system according to claim 11, wherein
the first and second lens groups are configured to move in such a manner as to satisfy the following condition when focusing on an object at infinity:

$$0.3 < D\_S2/D\_1S < 2.0$$

where D_1S is an interval between the first lens group and the aperture diaphragm and D_2S is an interval between the second lens group and the aperture diaphragm.

13. An optical imaging system according to claim 11, wherein
the first and second lens group are configured to move in such a manner as to satisfy the following condition when focusing on an object at infinity:

$$0.5 < D\_12/f < 2.5$$

where D_12 is an interval between the first and second lens groups and f is a focal length of the entire optical imaging system.

14. An optical imaging system according to claim 12, wherein the second lens group is comprised of a second front lens group having a positive optical power and a second rear lens group including at least one aspherical lens.

15. An optical imaging system according to claim 11, wherein
the aperture diaphragm is configured to be in a fixed position on an optical axis of the optical imaging system when focusing on an object in a close range.

16. A camera device comprising the optical imaging system according to claim 11.

17. A camera device according to claim 16, further comprising a function to convert a captured image into digital data.

18. A hand-held data terminal device comprising the camera device according to claim 17 as a photographic unit.

* * * * *